(12) United States Patent  
Modi et al.

(10) Patent No.: US 6,559,566 B2
(45) Date of Patent: May 6, 2003

(54) END SHIELD CONSTRUCTED WITH A SEPARATE COMPONENT HOLDER

(75) Inventors: Chetan O. Modi, Valley Park, MO (US); Stanley C. Meyer, St. Charles, MO (US); Donald Morgan, Florissant, MO (US); Thomas A. Pacello, Germantown, TN (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/782,458

(22) Filed: Feb. 12, 2001

(65) Prior Publication Data

US 2002/0109425 A1 Aug. 15, 2002

(51) Int. Cl.[7] .................................................. H02K 5/00
(52) U.S. Cl. ........................................... 310/89; 310/85
(58) Field of Search .............................. 310/89, 91, 71, 310/67 R, 85, 88

(56) References Cited

U.S. PATENT DOCUMENTS

| 4,868,436 | A | * | 9/1989 | Attilio et al. ............. 310/67 R |
| 4,885,496 | A |   | 12/1989 | Wheeler |
| 5,008,572 | A |   | 4/1991 | Marshall et al. |
| 5,015,894 | A | * | 5/1991 | Crow et al. .................... 310/71 |
| 5,101,114 | A | * | 3/1992 | Isozumi et al. ................ 390/48 |
| 5,134,327 | A |   | 7/1992 | Sumi et al. |
| 5,134,330 | A | * | 7/1992 | Haas et al. .................... 310/83 |
| 5,806,169 | A |   | 9/1998 | Trago et al. |

* cited by examiner

Primary Examiner—Thanh Lam
(74) Attorney, Agent, or Firm—Thompson Coburn LLP

(57) ABSTRACT

An end shield for an electric motor is provided with an integrally formed component compartment. The component compartment is mounted on a peripheral edge of the end shield. The component compartment has a hollow interior volume and a motor component used for controlling operation of the motor is received in the component compartment. The motor component is housed and protected in the component compartment.

28 Claims, 4 Drawing Sheets

US 6,559,566 B2

END SHIELD CONSTRUCTED WITH A SEPARATE COMPONENT HOLDER

BACKGROUND OF THE INVENTION

(1) Field of the Invention

The present invention relates to electric motors that typically have an external motor component and an enclosure mounted adjacent an exterior surface of the motor for holding the component therein. More specifically, the invention pertains to the construction of an end shield for the electric motor where the end shield is provided with an integrally formed component compartment that protects the motor component from inadvertent contact and damage to prevent malfunction of the electric motor.

(2) Description of the Related Art

Electric motors to which the present invention pertains are common in the art. Typically, these types of motors are used in domestic appliances such as air-conditioning and refrigeration units for driving compressors and pumps that have high starting torque requirements. Generally, these single-phase induction motors have a hollow, cylindrically shaped stator with axial opposite end surfaces, and a rotor and shaft rotatably disposed within the hollow interior bore of the stator. The stator has windings wound axially through the stator bore, and end-turns from the stator windings are positioned adjacent the stator end surfaces. End shields are mounted to the stator end surfaces to form a portion of the exterior surface of the motor. The end shields protect the stator windings and end turns from inadvertent contact and grounding while providing a mounting surface for rotor bearings and shaft bushings. The end shields also prevent debris from entering the hollow interior of the stator and interfering with operation of the motor.

Typically, motors used in these high starting torque applications have stator windings that include both run windings for producing the rotating electrical field in the stator and auxiliary windings for starting the motor. For a capacitor start induction motor, a capacitor is permanently connected in series with the auxiliary windings to generate an electrical field phase shift in the stator between the run and auxiliary windings to begin rotation of the motor with the necessary starting torque. As the motor comes up to speed, the auxiliary windings are switched off line.

Generally, the capacitor used in these applications is relatively large in size such that it must be located external to the motor. The capacitor is typically positioned inside an electrical enclosure mounted on an exterior surface of the motor housing between the end shields. During manufacture of the motor, the capacitor is connected to the motor auxiliary windings and positioned on the motor exterior surface. The electrical enclosure is then placed over the capacitor and attached to the motor exterior surface by any of several methods, including welding, mechanical fasteners, through a system of complementing tabs and slots on the electrical enclosure and the motor exterior surface, or any combination thereof.

This method of housing and protecting the capacitor has many drawbacks. First, as stated previously, the methods of attaching the electrical enclosure to the motor exterior surface complicate assembly and are often inefficient. The electrical enclosure is a separate part that must be provided on the manufacturing lines and installed on the motor in a time consuming assembly operation that is inherently inefficient and costly. Additionally, when the motor component is installed in the electrical enclosure, the capacitor sometimes moves within the electrical enclosure. This movement within the enclosure often results in accidental grounding of the auxiliary windings or physical damage to the capacitor as it impacts with the interior of the enclosure. The likelihood of these occurrences increases when the motor is moved through the production lines and when it is installed in the appliance.

What is needed is an electric motor with an electrical enclosure that is formed integrally with a part of the electric motor so as to reduce parts and eliminate assembly operations during manufacture of the motor. Such an enclosure would hold the capacitor or other motor component away from the structure of the motor to prevent grounding of the capacitor or other component and malfunctioning of the motor. Such an electrical enclosure would protect the motor component from damage. Such an electrical enclosure would provide the electric motor with a low profile so as to reduce overall space considerations for the electric motor when it is installed in an appliance.

SUMMARY OF THE INVENTION

The electric motor of the present invention is provided with a component compartment integrally formed on an end shield of the electric motor. The component compartment houses and protects a motor component used for controlling the operation of the motor. The component compartment holds the motor component away from the structure of the electric motor to prevent the motor component from moving within the compartment. The component compartment prevents the component from being damaged, potentially grounding, and contributing to the malfunction of the motor from such movement. The component compartment has sufficient strength to protect the motor component from damage from impact with objects external to the motor.

The component compartment preferably extends axially away from the end shield so that the component compartment is positioned adjacent an exterior surface of the electric motor. This provides a low profile for the electric motor to reduce size considerations for the motor as it is used in the appliance. By forming the component compartment integrally with the end shield, the number of parts and number of assembly operations may be reduced, thus lowering the costs associated with the manufacture of the motor.

BRIEF DESCRIPTION OF THE DRAWINGS

Further objects and features of the invention are revealed in the following detailed description of the preferred embodiment of the invention and in the drawings wherein.

Corresponding reference numerals indicate corresponding parts through the several views of the drawings.

DETAILED DESCRIPTION OF THE PREFERRED EMBODIMENT OF THE INVENTION

Figure 1:
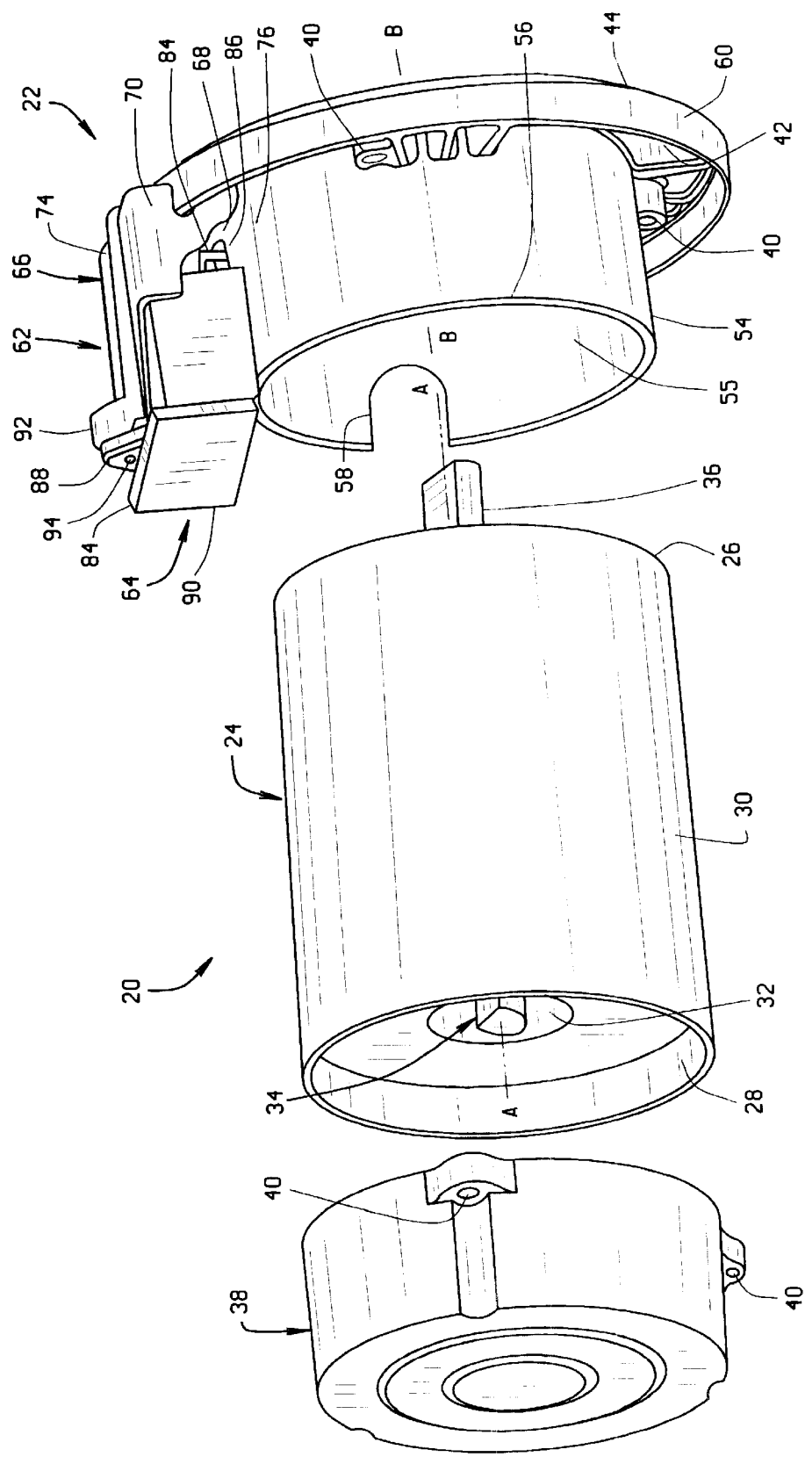
FIG. 1 is an exploded, perspective view of an electric motor and the end shield of the present invention with a portion of a component compartment on the end shield removed to show an interior of the component compartment.

FIG. 1 shows the general arrangement of an electric motor 20 and the end shield 22 of the present invention. Because the motor component parts, apart from the end shield 22, are not critical to an understanding of the invention, they will not be described in detail. It should also be understood that the motor described and shown in the drawings is only one example of an environment in which the end shield 22 could be used, and that the end shield 22 could be used with various different types of motors. The electric motor 20 has a generally cylindrically shaped stator 24 with axially opposite front and rear mounting surfaces 26,28 and an exterior surface 30 extending between the front and rear mounting surfaces 26,28. The stator 24 has a hollow interior 32 and a center axis A—A extending between the front and rear mounting surfaces 26,28. A rotor 34 and shaft 36 for the motor 20 are disposed within the stator hollow interior 32 for rotation about the center axis A—A. For this description, the front mounting surface 26 refers to that side of the stator 24 from which the motor shaft 36 extends and the rear mounting surface 28 refers to the side axially opposite therefrom. Although the stator 24 described herein is cylindrical in shape, the end shield 22 of the present invention may be used on electric motors having a generally square cross section as is typical when the stator is constructed from axially stacked laminations. Thus, the end shield 22 may have a shape that corresponds to the geometry of the stator mounting surface upon which it is installed. The end shield 22 of the present invention is constructed from a die cast aluminum alloy. It may be made, however, from any electrically resistant plastic that allows the end shield to be produced in a high capacity, low cost injection molding process.

As shown in FIG. 1, the front end shield 22 is positioned over the stator front mounting surface 26, and a rear end shield 38 is provided on the axially opposite rear mounting surface 28 of the motor. Together, the end shields 22,38 cover over the stator mounting surfaces 26,28 while providing a rotational support surface for the rotor 34 and shaft 36. The end shields 22,38 also prevent large sized debris from entering the stator hollow interior 32 while protecting the stator windings (not shown) from inadvertent contact and other damage. The end shields 22,38 are held against the stator mounting surfaces 26,28 by mechanical fasteners (not shown) that pass through the fastener holes 40 of the end shields and over the stator exterior surface 30. It should be noted that the end shields may also be attached to the stator directly by mechanical fasteners or by other means, such as an encapsulant.

Figure 5:
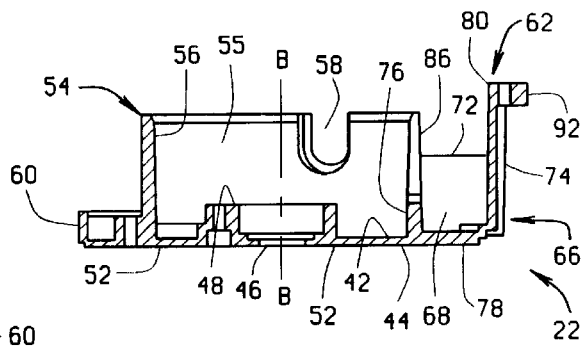
FIG. 5 is a side cross-sectional view of the end shield taken along line 5—5 of FIG. 3.
Figure 6:
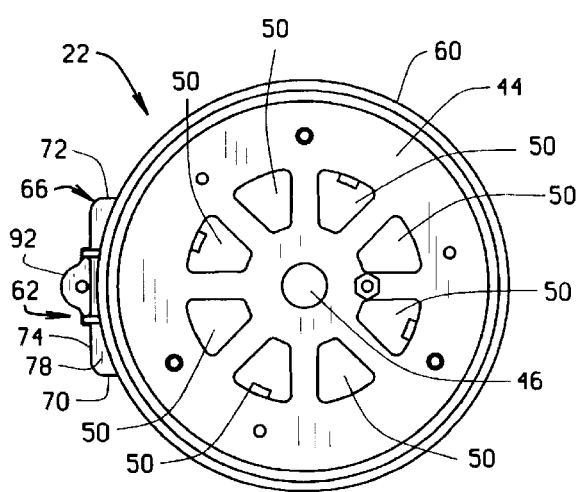
FIG. 6 is an elevational view of an exterior surface of the end shield of FIG. 1.

FIGS. 2–5 show greater detail of an interior surface 42 of the front end shield 22. For this description the front end shield interior surface 42 is that surface that abuts the stator front mounting surface 26 when the front end shield 22 is installed on the motor 20. Although the construction of the front end shield 22 is described hereafter, it should be understood that the rear end shield 38 may also be similarly constructed. As shown in FIG. 6, the end shield 22 has an exterior surface 44 opposite the interior surface 42 that is preferably flat to allow the end shield to mount adjacent a separate device, as will be described later. The end shield 22 has a center axis B—B that extends through the interior and exterior surfaces 42,44, and preferably aligns with the stator center axis A—A when the end shield 22 is installed on the motor 20. The end shield 22 is provided with a shaft hole 46 to allow the end shield 22 to be assembled on the front mounting surface 26 or shaft side mounting surface of the motor 20. The end shield interior surface 42 in the area around the shaft hole 46 is provided with an inner annular wall 48 extending outward therefrom. The inner annular wall 48 preferably houses a shaft bushing (not shown) to give radial support to the shaft 36 during motor operation. The end shield 22 is also provided with ventilation holes 50 where cooling air is drawn from the motor external environment and directed into the stator hollow interior 32 to cool stator windings and other components. The end shield interior surface 42 is also provided with strengthening webs 52 extending radially outward from the inner annular wall 48 on opposite sides of the vent holes 50. The webs 52 provide reinforcement for the end shield 22 when it is assembled on the motor 20.

The front end shield 22 is preferably provided with a stator compartment wall section 54 extending axially outward from the end shield interior surface 42. The stator compartment wall section 54 extends around the end shield center axis B—B, spaced from the inner annular wall 48, to define an interior volume 55 for a stator compartment 56. The stator compartment 56 receives a portion of the stator 24 within its interior volume 55 when the end shield 22 is assembled with the motor 20. Preferably, the stator compartment wall section 54 engages a portion of the stator exterior surface 30 to assist in aligning the end shield on the motor 20 during assembly. The stator compartment wall section 54 is also provided with a main power feed opening 58 to allow connection of a power supply (not shown) to the stator windings (not shown). Although the Figures show the stator compartment wall section 54 to be annular, the stator compartment wall section 54 may be configured to conform to any contour of the stator exterior surface 30. It also should be noted that the end shield of the present invention may be constructed without the stator compartment wall section when other means for aligning the end shield with the motor during motor assembly are used, such as pins or other locating devices.

The end shield 22 has an outer peripheral edge 60 that extends around the end shield center axis B—B and is radially spaced from the stator compartment wall section 54. A component compartment 62 extends outward from the end shield outer peripheral edge 60 and houses and protects a motor component 64 used for controlling the operation of the electric motor 20 as is shown in FIG. 1. Preferably, the component compartment 62 extends axially from the end shield interior surface 42 such that the component compartment 62 is positioned on the motor 22 between the front and rear end shields 22,38. The component compartment 62 is preferably positioned adjacent the stator exterior surface 30 so as to present a low profile and low cross sectional aspect that does not interfere with other components located adjacent the motor 20 when the motor 20 is installed in the appliance. Although the end shield 22 is constructed with the component compartment 62, it should be noted that it is also possible to construct the rear end shield 38 with the component compartment.

The component compartment 62 has a component compartment wall section 66 that extends axially outward from the end shield interior surface 42 to bound the component compartment 62 and define an interior volume 68 in which the motor component 64 is received. The component compartment wall section 66 includes first and second side walls 70,72 that are spaced apart from each other and project generally axially outward from the end shield interior surface 42. The component compartment wall section 66 also includes top and bottom walls 74,76 that are radially spaced from each other on the end shield 22 and project generally axially from the end shield interior surface 42. The top and bottom walls 74,76 extend between the first and second side walls 70,72 to form a general rectangular box structure for the component compartment 62. Preferably, a portion of the stator compartment wall section 54 forms the component compartment bottom wall 76. The component compartment 62 is also provided with a front wall 78 to provide a boundary between the component compartment interior 68 and the separate device to which the motor 20 attaches. Opposite the front wall 78, the component compartment 62 is provided with a component compartment opening 80 to allow the motor component 64 to be received within the component compartment interior volume 68 of the motor when the motor component 64 is assembled to the motor. Preferably, the component compartment 62 is formed integral with the end shield 22, and, more preferably, the component compartment 62 is formed monolithically with the end shield 22.

Figure 2:
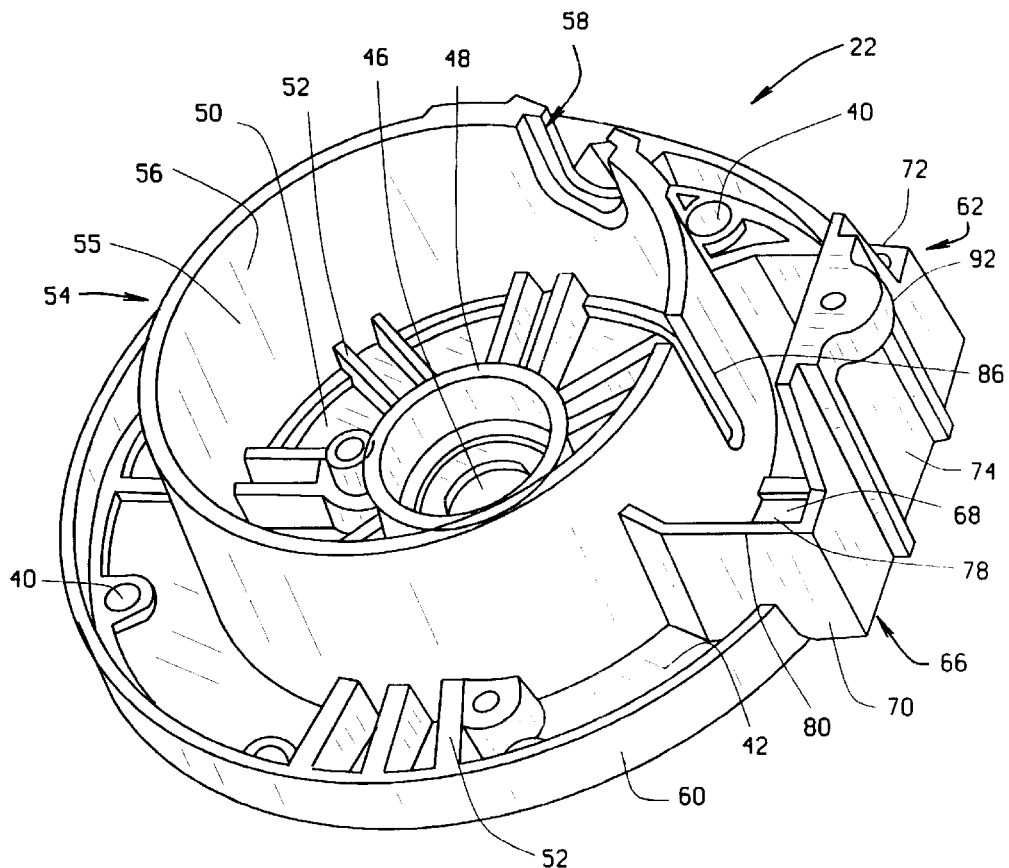
FIG. 2 is a perspective view of an interior surface of the end shield of FIG. 1.
Figure 4:
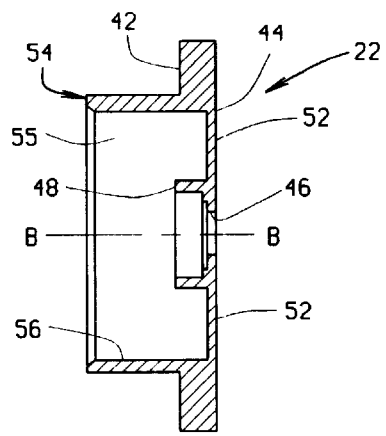
FIG. 4 is a side cross-sectional view of the end shield taken along line 4—4 of FIG. 3.
Figure 3:
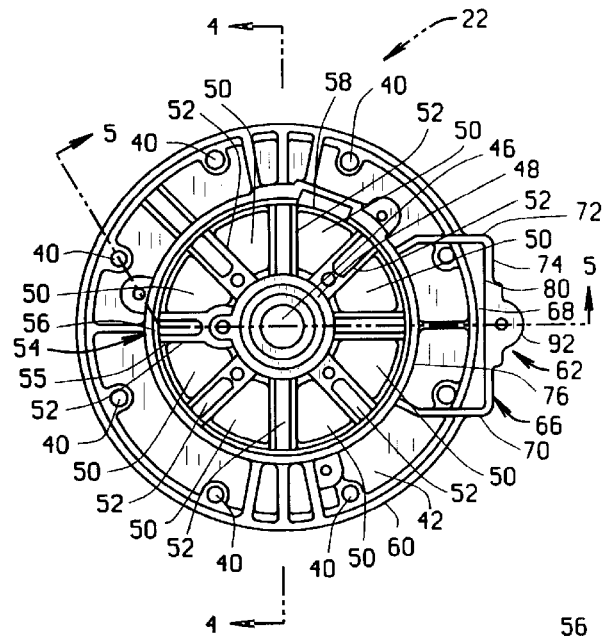
FIG. 3 is an elevation view of the interior surface of the end shield of FIG. 1.

As shown in FIG. 1, the motor component 64 is installed in the component compartment interior volume and is used to control the operation of the electric motor 20. Preferably, the motor component 64 is an electrical component 82, such as a capacitor or a starting switch. The cut-away view of the component compartment side wall shown in FIG. 1 provides greater detail of the arrangement of the electrical component 82 in the component compartment 62. The electrical component 82 has an associated electrical conductor 84 that provides a current path from the component 82 to the motor 20. The electrical conductor 84 is positioned in the component compartment interior volume 68. The electrical conductor 84 may include a quick disconnect or plug style connector that is mounted in the component compartment interior 68 and interlocks with the electrical component 82. The electrical component 82 is preferably attached to the electrical conductor 84 within the component compartment interior volume 68. In order to connect the motor component 64 to the stator windings, a conductor opening 86 is provided in the component compartment bottom wall 76. The conductor opening 86 is also shown in FIGS. 2 and 5. The electrical conductor 84 is directed through the conductor opening 86 and simplifies the wire runs needed to connect the electrical component 82 to the motor 20.

In order to avoid inadvertent grounding of the electrical component conductor 84 with the end shield 22 or the component compartment 62, the component conductor 84 is preferably held spaced from the component compartment wall section 66. Preferably, a portion of the component compartment wall section 66 has an axial length that is longer than the length of the electrical component 82 such that the electrical conductor 84 is spaced from the component compartment front wall 70. In the preferred embodiment, the top wall 74 is provided with a greater axial length than the motor component 64. To provide further stability for the motor component 64 when it is installed in the component compartment 62, the motor component 64 is provided with a projecting tab 88 extending outward from its exterior surface 90 and the component compartment top wall 74 is provided with a matching attachment flange 92. The projecting tab 88 is engaged against the attachment flange 92, and, preferably, a mechanical fastener 94 such as a screw and nut (not shown) is used to secure the two together. The engagement of the projecting tab 88 and the attachment flange 92 maintains the spatial separation of the component conductor 84 and the compartment front wall 78 and keeps the motor component 64 electrically connected with the electric motor 20. Preferably, the top wall 74 is formed with the attachment flange 92 to create the access needed to facilitate installation of the mechanical fastener 94 used to secure the motor component 64 in the component compartment 62.

Figure 7:
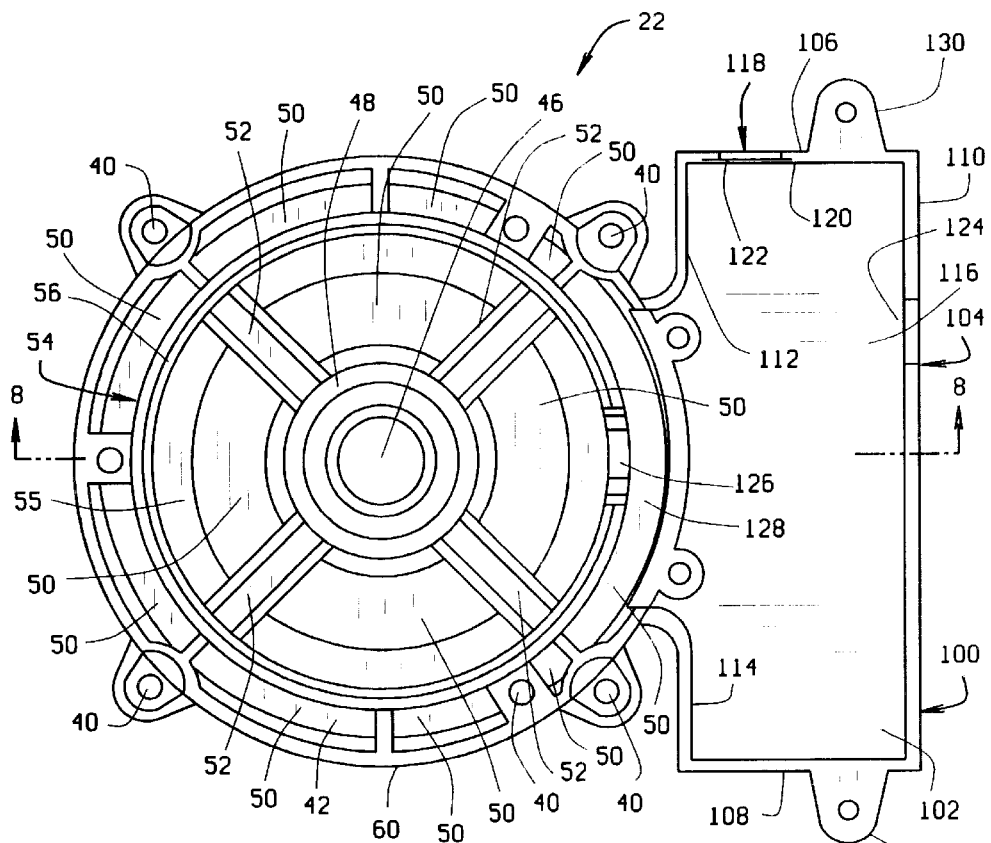
FIG. 7 is an alternate embodiment of the end shield of FIG. 1.
Figure 8:
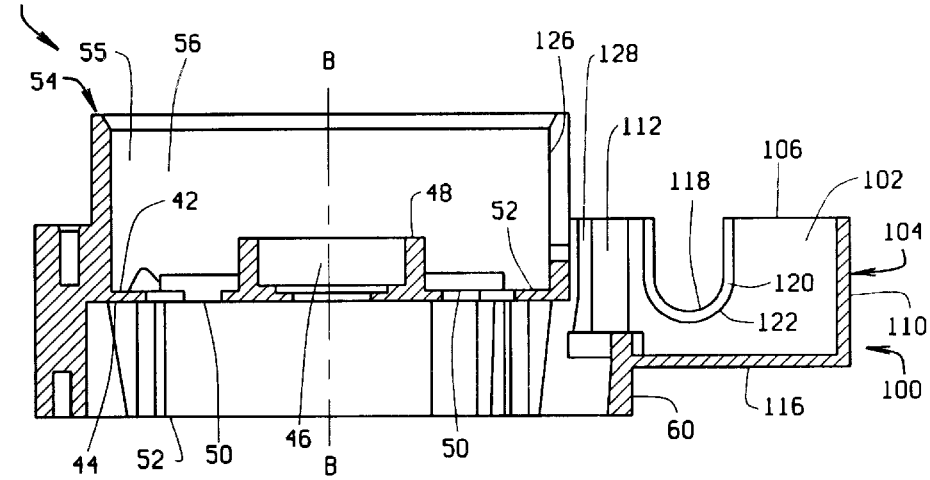
FIG. 8 is a cross sectional view of the end shield of FIG. 7 taken along line 8—8 of FIG. 7.

An alternate embodiment of the end shield of the present invention is shown in FIGS. 7 and 8. As shown in FIGS. 7 and 8, the end shield of the alternate embodiment differs from the previously described embodiment in that it has an enlarged component compartment 100 dimensioned to receive more than one motor component within a hollow interior 102 of the component compartment. Because the other features of the alternate embodiment are basically the same as the previously described embodiment, they are identified by the same reference numbers. The component compartment interior 102 is bounded by the component compartment wall section 104 that includes first and second side walls 106,108 spaced apart from each other and projecting generally outward from the end shield interior surface 42. The component compartment wall section 104 also includes a top wall 110 spanning between the first and second side walls 106,108. Opposite the top wall 110, the component compartment wall section 104 includes two bottom wall sections 112,114 extending generally radially outward from the end shield peripheral edge 60 to each of the respective first and second side walls 106,108. In this embodiment, the two bottom wall sections 112,114 are radially spaced from the stator compartment wall section 54. The component compartment interior 102 is also bounded by a front wall 116 spanning between the first and second side walls 106,108 and radially between the top wall 110 and the bottom wall sections 112,114.

In the embodiments shown in FIGS. 7 and 8, the component compartment 100 may house more than one motor component, for example a capacitor, an air switch, a grounding lug, or any combination thereof. In the embodiment of FIGS. 7 and 8, a conductor opening 118 is provided in one side wall 106 to provide access for a conductor, for example, a main power input for the motor, into the component compartment 100. The conductor opening 118 is preferably provided with a reduced width edge 120 and a shoulder surface 122 that follows the shape of the opening 118 to receive a stress relief grommet (not shown) that provides a seal around the conductor (not shown). The top wail 110 may be provided with a switch opening 124 to allow actuation of a switch motor component from outside the component compartment interior 102.

In the embodiment shown in FIGS. 7 and 8, the stator compartment wall section 54 is provided with a stator compartment opening 126 that leads to a radial space 128 in between the stator compartment 56 and the component compartment 100. The electrical conductors (not shown) from one or more of the motor components are directed from the component compartment interior 102 in between the two spaced apart bottom wall sections 112,114 into the radial space 128 between the stator compartment 56 and the component compartment 100 through the stator compartment opening 126 and into the stator compartment interior 55.

In an arrangement similar to the embodiment shown in FIGS. 1 through 6, the component compartment 100 is provided with at least one attachment flange 130 for securing the motor component(s) thereto. In the embodiment in FIGS. 7 and 8, the attachment flanges 130 are provided on each of the first and second side walls 106,108 as each of the walls 106,108 clears the supporting structure of the end shield by a sufficient distance to facilitate the secure engagement of the motor component projecting tab 88 against the respective attachment flange 130. The attachment flange 130 may also be positioned on the appropriate surface of the component compartment wall 104 adjacent the motor component to be secured. The attachment flange 130 engages the projecting tab 88 of the motor component to spatially orient the motor component within the component compartment interior 102.

The end shield 22 of the present invention provides a component compartment 62 that protects the motor component 64 while presenting a low profile for the motor 20. The motor component 64 is held within the compartment 62 to prevent undesired movement and to protect the component 64 from damage from the motor external environment. By forming the component compartment 62 integral with the end shield 22, the number of parts used in the production of the motor 20 may be reduced and assembly of the motor 20 is simplified.

Various other changes to the preferred embodiment of the invention described above may be envisioned by those of ordinary skill in the art. However, those changes and modifications should be considered as part of the invention which is limited only by the scope of the claims appended hereto and their equivalents.

What is claimed is:

1. An electric motor comprising:

a stator having a center axis;

a shaft rotatably supported within the stator and aligned coaxially with the stator center axis;

an end shield mounted to the stator, the end shield having an outer peripheral edge spaced from and extending around the stator center axis;

a component compartment formed integrally with the end shield at the peripheral edge of the end shield, the component compartment having a hollow interior volume and an opening to the interior volume that is accessible from outside the motor;

a motor component inserted through the component compartment opening and into the interior volume; and, the component compartment has at least one projecting flange and the motor component has a projecting tab that engages against the component compartment flange, and a fastener connects the motor component tab to the component compartment flange thereby securing the motor component in the component compartment.

2. The electric motor of claim 1, wherein:

the end shield has a shaft hole that receives the shaft of the motor there through.

3. The electric motor of claim 1, wherein:

the end shield and component compartment are monolithically formed.

4. The electric motor of claim 1, wherein:

the end shield has a first wall section that projects axially from the end shield and extends around a portion of the stator.

5. The electrical motor of claim 4, wherein:

the component compartment is on the end shield first wall section.

6. An electric motor comprising:

a stator having a center axis;

a shaft rotatably disposed within the stator and aligned coaxially with the stator center axis;

an end shield mounted to the stator, the end shield having an outer peripheral edge spaced from and extending around the stator center axis;

a component compartment formed integrally with the end shield at the peripheral edge of the end shield, the component compartment having a hollow interior volume and an opening to the interior volume that is accessible from outside the motor;

a motor component inserted through the component compartment opening and into the interior volume; and, the component compartment has a bottom wall and a top wall that are radially spaced from each other on the end shield and projecting generally axially from end shield, a pair of spaced side walls that extend radially between the bottom wall and the top wall and project generally axially from the end shield, and a front wall on the end shield that extends between the top and bottom walls and between the side walls and is opposite the component compartment opening.

7. The electric motor of claim 6, wherein:

the motor component is an electric component that has at least one electrical conductor extending from the electrical component in the interior volume of the component compartment.

8. The electric motor of claim 7, wherein:

the bottom wall of the component compartment has a conductor opening and the electrical conductor of the electrical component passes through the conductor opening.

9. The electric motor of claim of 6, wherein:

the motor compartment has an axial length and at least one of the component compartment top wall, bottom wall, and side walls has an axial length that is larger than the motor component axial length and is connected to the motor component and holds the motor component in a spaced relationship relative to the component compartment front wall.

10. The electric motor of claim 9, wherein:

the motor component is an electrical component that has at least one electrical conductor that extends from the electrical component in the interior volume of the component compartment and is spaced from the component compartment front wall.

11. The electric motor of claim 6, wherein:

the end shield has a first wall section that projects axially from the end shield and extends around a portion of the stator.

12. The electric motor of claim 11, wherein:

the bottom wall of the component compartment is a portion of the end shield first wall section.

13. The electric motor of claim 12, wherein:

the component compartment bottom wall has a first and second section that are radially spaced from the end shield first wall section.

14. An electric motor comprising:

a stator having a center axis, an exterior surface that extends around the center axis, and axially opposite first and second end surfaces;

an end shield mounted over the first end surface of the stator, the end shield having a first wall section that projects axially from the end shield and extends around a portion of the stator exterior surface;

a component compartment integrally formed with the end shield spaced radially outward from the end shield first wall section and extending axially from the end shield where the component compartment is positioned adjacent the stator exterior surface;

at least one motor component for operating the motor being housed and protected in the component compartment; and, the component compartment has opposite first and second side walls that are spaced from each other and extend radially outward from the first wall section, a top wall radially spaced from the first wall section and extending between the first and second side walls, and a front wall extending radially outward from the end shield to the top wall between the first and second side walls, whereby the top wall, first and second side walls, a portion of the first wall section, and the front wall bound the component compartment and define a hollow interior of the component compartment.

15. The electric motor of claim 14, wherein:

the component compartment has a compartment opening opposite the front wall and the motor component is inserted through the compartment opening into the interior volume when the component is assembled with the motor.

16. The electric motor of claim 15, wherein:
the motor component includes an electrical component and at least one electrical conductor that allows electrical connection of the electrical component to the motor.

17. The electric motor of claim 16, wherein:
the portion of the first wall section has a conductor opening therethrough and the at least one electrical conductor passes through the conductor opening when the motor component is assembled with the motor.

18. The electric motor of claim 17, wherein:
the electrical component has a attachment flange that engages against the top wall of the component compartment when the electrical component is installed in the component compartment whereby the electrical component is spaced from the front wall and electrically connected to the motor.

19. The electric motor of claim 18, wherein:
the electrical component is a capacitor.

20. The electric motor of claim 18, wherein:
the electrical component is a switch.

21. The electric motor of claim 14, wherein:
the motor component includes more than one electrical component.

22. An end shield for an electric motor wherein the electric motor has at least one motor component connected thereto, the end shield having an outer peripheral edge and a component compartment integrally formed therewith projecting from the outer peripheral edge, the component compartment having a hollow interior volume and an opening, the interior volume being dimensioned to receive the at least one motor component being inserted through the opening and into the hollow interior of the component compartment when the at least one motor component is connected to the electric motor and the end shield is installed on the electric motor; and,
the component compartment has at least one attachment flange extending outward from the component compartment at the opening and the at least one motor component engages against the attachment flange when the at least one motor component is received in the hollow interior of the component compartment.

23. The end shield of claim 22, wherein:
the component compartment and end shield are monolithically formed.

24. The end shield of claim 22, wherein:
the motor component is spaced from the end shield interior surface when the motor component is received in the component compartment and engaged against the attachment flange.

25. An end shield for an electric motor wherein the electric motor has at least one motor component connected thereto, the end shield having an outer peripheral edge and a component compartment integrally formed therewith projecting from the outer peripheral edge, the component compartment having a hollow interior volume and an opening, the interior volume being dimensioned to receive the at least one motor component being inserted through the opening and into the hollow interior of the component compartment when the at least one motor component is connected to the electric motor and the end shield is installed on the electric motor;
the end shield has opposite interior and exterior surfaces and a center axis passing through the interior and exterior surfaces;
a first wall section extending axially outwardly from the interior surface and around the center axis to form a first compartment with a first hollow interior volume, the first compartment receiving a portion of the electric motor in the first hollow interior volume when the end shield is assembled with the motor; and
a second wall section extending axially outward from the interior surface, the second wall section and a portion of the first wall section defining the component compartment, the component compartment being radially offset from the center axis by the first compartment.

26. The end shield of claim 25, wherein:
the portion of the first wall section bounding the component compartment has a conductor opening and at least one electrical conductor of the motor component passes through the conductor opening when the motor component is received in the component compartment and the motor component is connected to the motor.

27. An end shield for an electric motor wherein the electric motor has at least one motor component connected thereto, the end shield having an outer peripheral edge and a component compartment integrally formed therewith projecting from the outer peripheral edge, the component compartment having a hollow interior volume and an opening, the interior volume being dimensioned to receive the at least one motor component being inserted through the opening and into the hollow interior of the component compartment when the at least one motor component is connected to the electric motor and the end shield is installed on the electric motor;
the end shield has opposite interior and exterior surfaces and a center axis passing through the interior and exterior surfaces;
a first wall section extends axially outward from the end shield interior surface and around the center axis and forms a first compartment with a first hollow interior volume, the first compartment is dimensioned to receive a portion of the electric motor in the first hollow interior volume when the end shield is assembled with the motor; and
a second wall section extends axially outward from the end shield interior surface, the second wall section is spaced radially from the first wall section and defines the component compartment, the second wall section has first portions that extend generally radially outward from the end shield peripheral edge and a second portion that spans between the first portions.

28. The end shield of claim 27, wherein:
the component compartment houses more than one motor component.

* * * * *